(12) United States Patent
Gaw

(10) Patent No.: US 10,301,033 B2
(45) Date of Patent: May 28, 2019

(54) FOAMED ENERGY ABSORPTIVE FASTENER SEAL CAP

(71) Applicant: The Boeing Company, Chicago, IL (US)

(72) Inventor: Kevin O'Brien Gaw, Tukwila, WA (US)

(73) Assignee: The Boeing Company, Chicago, IL (US)

( * ) Notice: Subject to any disclaimer, the term of this patent is extended or adjusted under 35 U.S.C. 154(b) by 130 days.

(21) Appl. No.: 15/275,338

(22) Filed: Sep. 24, 2016

(65) Prior Publication Data

US 2017/0008636 A1 Jan. 12, 2017

Related U.S. Application Data

(62) Division of application No. 13/363,853, filed on Feb. 1, 2012, now abandoned.

(51) Int. Cl.
| | | |
|---|---|---|
| *B64D 37/32* | (2006.01) | |
| *B64D 37/06* | (2006.01) | |
| *B64D 45/02* | (2006.01) | |
| *B64C 3/34* | (2006.01) | |

(52) U.S. Cl.
CPC .............. *B64D 37/32* (2013.01); *B64C 3/34* (2013.01); *B64D 37/06* (2013.01); *B64D 45/02* (2013.01); *Y10T 29/49947* (2015.01); *Y10T 29/49948* (2015.01); *Y10T 29/49963* (2015.01)

(58) Field of Classification Search
CPC .......... B64D 45/02; B64D 37/06; B64C 3/34; Y10T 29/49947; Y10T 29/49948; Y10T 29/49963
See application file for complete search history.

(56) References Cited

U.S. PATENT DOCUMENTS

| | | | | |
|---|---|---|---|---|
| 2,710,113 A | * | 6/1955 | Pritchard | ............... B64D 37/06 156/280 |
| 4,100,860 A | | 7/1978 | Gablin et al. | |
| 4,476,995 A | | 10/1984 | Bellino et al. | |
| 4,905,931 A | * | 3/1990 | Covey | .................... B64D 45/02 244/1 A |
| 5,382,397 A | | 1/1995 | Turner, Jr. | |

(Continued)

OTHER PUBLICATIONS

"Sealants and Sealing Introduction." "M"Level3.com, Aircraft Sealants—Information for maintenance engineer students, pp. 1-21, accessed Jan. 3, 2012, http://www.mlevel3.com/BCIT/Sealants.htm.

(Continued)

*Primary Examiner* — Bayan Salone

(74) *Attorney, Agent, or Firm* — Yee & Associates, P.C.

(57) ABSTRACT

A fuel tank system comprising a fuel tank, a number of fasteners, and a number of covers. The number of fasteners has a number of ends extending into an interior of the fuel tank. The number of covers is configured to cover the number of ends of the number of fasteners. A cover in the number of covers comprises a housing configured to cover an end of a fastener in the number of ends, a deformable material associated with an interior side of the cover, and cells that are present within the deformable material. The deformable material is configured to contain energy within the cover in which the energy is caused by an electromagnetic event.

18 Claims, 4 Drawing Sheets

(56) References Cited

U.S. PATENT DOCUMENTS

| | | | |
|---|---|---|---|
| 5,394,449 A | | 2/1995 | Johnson et al. |
| 5,590,992 A | | 1/1997 | Russell |
| 6,086,972 A | * | 7/2000 | Rayburn ................ B25B 23/00 |
| | | | 411/373 |
| 8,451,577 B2 | | 5/2013 | Bessho et al. |
| 8,717,735 B2 | * | 5/2014 | Day ........................ F16J 15/14 |
| | | | 361/218 |
| 9,140,291 B2 | | 9/2015 | Yoon et al. |
| 2012/0074257 A1 | * | 3/2012 | Bessho ................ B64D 45/02 |
| | | | 244/1 A |
| 2013/0037655 A1 | * | 2/2013 | Bradley ................... B64C 3/26 |
| | | | 244/124 |

OTHER PUBLICATIONS

Wicklund, Federal Aviation Administration Memorandum, "Policy on Issuance of Special Conditions and Exemptions Related to Lightning Protection of Fuel Tank Structure," Policy Reference AC25.981-1C, May 2009, pp. 1-16.

"Flying High," ASI Adhesives Magazine, Sep. 2005, pp. 1-3.

Gaw, "Foamed Energy Absorptive Fastner Seal Cap", U.S. Appl. No. 13/363,853, filed Feb. 1, 2012, 36 pages.

Office Action, dated Feb. 26, 2016, regarding U.S. Appl. No. 13/363,853, 12 pages.

Final Office Action, dated May 11, 2016, regarding U.S. Appl. No. 13/363,853, 11 pages.

* cited by examiner

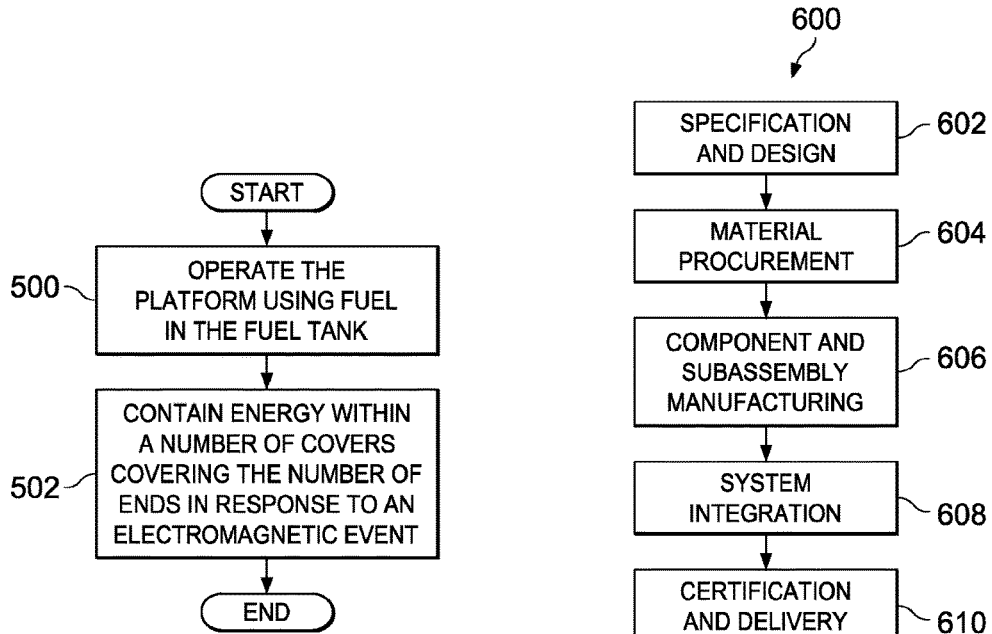
FIG. 5
FIG. 6
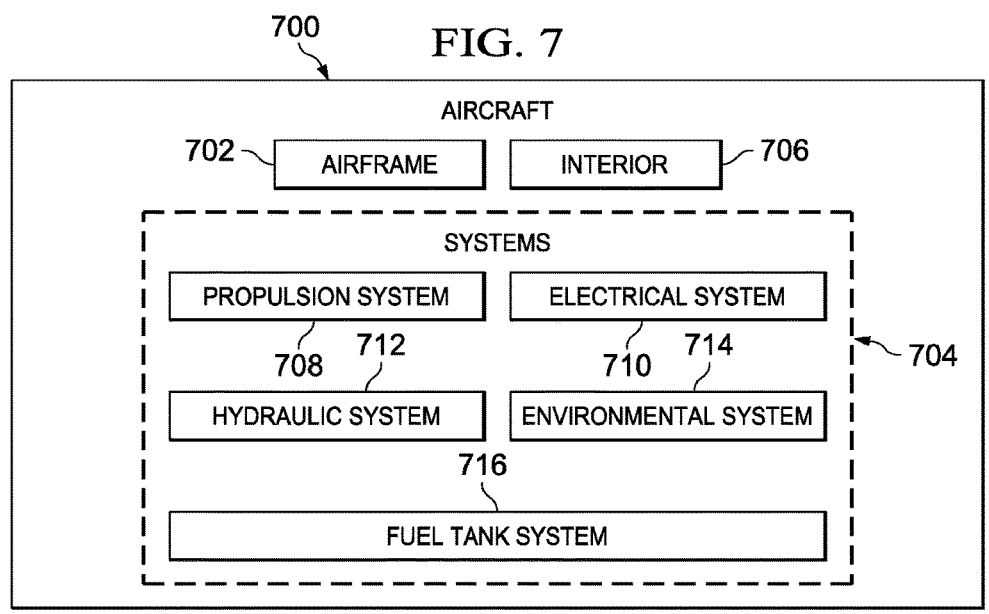
FIG. 7

FOAMED ENERGY ABSORPTIVE FASTENER SEAL CAP

This application is a divisional application of U.S. patent application Ser. No. 13/363,853, filed Feb. 1, 2012.

BACKGROUND INFORMATION

1. Field

The present disclosure relates generally to fuel tanks and, in particular, to a method and apparatus for reducing the transfer of energy within the interior of a fuel tank.

2. Background

Fuel tanks in aircraft are often integral structures to the aircraft. For example, the wing structure of an aircraft may be sealed. The internal cavities of the sealed wing structure may be used as a fuel tank. These types of wings are also referred to as "wet wings".

With a wet wing, components, such as fasteners, hoses, tubing, or other components that extend into the wing, are sealed to exclude the outside from the inside or covered to reduce or eliminate the buildup of electrical charge on conductive surfaces. These components can extend through structures within the fuel tank, such as struts and stringers, or into the walls of the fuel tank via holes formed in the walls. In conventional fuel tanks made from metal, components and the holes through which they extend are sealed to reduce leaking or seepage of the fuel tank formed in the wing. In composite structures, the sealing of metal surfaces and the holes that penetrate the structure have three purposes: 1) the reduction in fuel leakage, with respect to fuel leaking out of the tank; 2) other fluids entering or exiting the fuel tank; and 3) coverage of metal components that can have a propensity to accumulate electrical charge.

Components, such as metallic fasteners, may be sealed. Sealant in the form of seal caps may cover these fasteners. A "seal cap" is a structure that covers an end of a metallic component. The metallic component may be a fastener. The end may be the head fastener or the threaded end of the fastener with a nut. The fastener may be for example, a bolt, a screw, or some other type of fastener.

For example, a seal cap may be attached to the end of a fastener that extends into the interior of the fuel tank. This seal cap is configured to provide a seal against the flow of fuel out of the fuel tank. The seal cap may also reduce or eliminate the accumulation of electrical charge on the surface of the exposed fastener.

Seal caps are often comprised of materials that retain sealing properties when submerged in fuel and/or when left dry for different periods of time. For example, metal seal caps are typically used in fuel tanks for aircraft. These types of seal caps typically have aluminum housings that fit over the protruding end of a fastener on the interior of the fuel tank. Sealants may be placed into the seal caps prior to the seal caps being placed on the fastener. The sealant may be in the form of a plastic forming material.

For example, a seal cap may have an interior that is filled with an uncured sealant. This seal cap with the sealant is then pressed into place on the fastener. When in this position, excess sealant extrudes from around the bottom and from a hole in the top of the cap. This sealant may be blended around and onto the exterior of the cap. The sealant is then reacted to form the final sealant material.

Seal caps also may be configured to provide protection against phenomena, such as sparking, that results from electromagnetic events. The electromagnetic current may be current from a lightning strike. With the use of sealants in seal caps, the size of seal caps and the amount of sealant used may be increased to provide additional protection against electromagnetic events.

This increase of internal mass to the seal cap resulting from the sealant filling the internal volume of a seal cap, however, adds additional weight. With the use of seal caps for each of the fasteners in the fuel tank, the increased weight resulting from this use of seal caps attached to fasteners is undesirable.

Therefore, it would be desirable to have a method and apparatus that takes into account at least some of the issues discussed above, as well as possibly other issues.

SUMMARY

In one illustrative embodiment, a fuel tank system comprises a fuel tank, a number of fasteners, and a number of covers. The number of fasteners has a number of ends extending into an interior of the fuel tank. The number of covers is configured to cover the number of ends of the number of fasteners. A cover in the number of covers comprises a housing configured to cover an end of a fastener in the number of ends, a deformable material associated with an interior side of the cover, and cells that are present within the deformable material. The deformable material is configured to contain energy within the cover in which the energy is caused by an electromagnetic event.

In another illustrative embodiment, an apparatus comprises a housing and a deformable material. The housing is configured to cover an end of a fastener in a vessel tank. The deformable material is associated with an interior side of a cover. Cells are present within the deformable material. The deformable material is configured to contain energy within the cover in which the energy is caused by an electromagnetic event.

In yet another illustrative embodiment, a method for operating a platform with a fuel tank is provided. The platform is operated using fuel in the fuel tank. The fuel tank has a fastener having an end within an interior of the fuel tank. Energy is contained within a cover that covers the end. At least one of a housing of the cover, a deformable material in the cover, and cells present within the deformable material contains the energy within the cover. The energy within the cover is caused by an electromagnetic event.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

FIG. 5 is an illustration of a flowchart of a process for operating a platform with a fuel tank in accordance with an illustrative embodiment;

FIG. 6 is an illustration of an aircraft manufacturing and service method in accordance with an illustrative embodiment; and FIG. 7 is an illustration of an aircraft in which an illustrative embodiment may be implemented.

DETAILED DESCRIPTION

Figure 1:
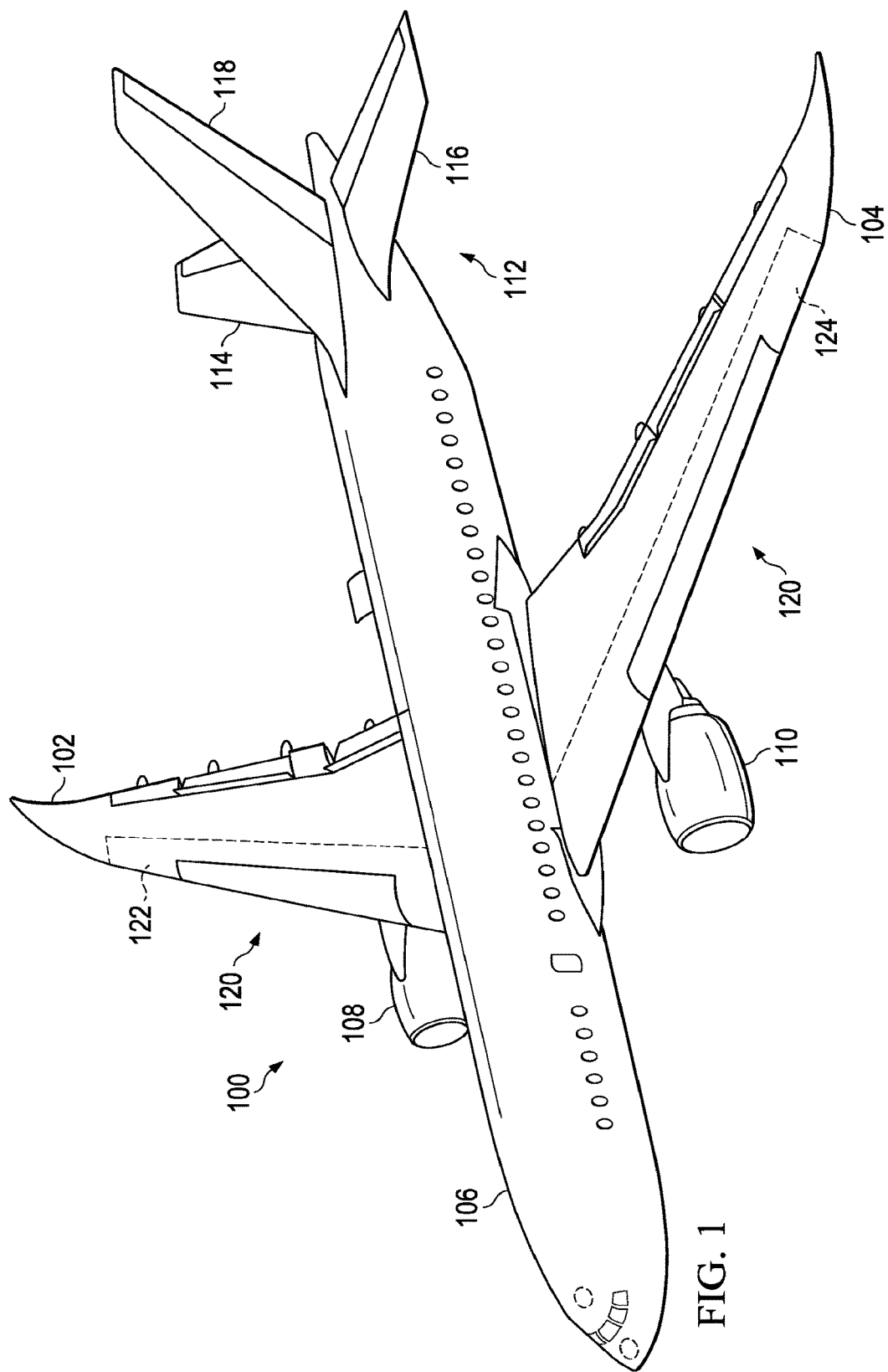
FIG. 1 is an illustration of an aircraft in accordance with an illustrative embodiment.

With reference now to the figures and, in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106. As depicted, aircraft 100 also includes fuel tank system 120. As depicted, fuel tank system 120 includes fuel tank 122 and fuel tank 124.

Fuel tank 122 is located in wing 102, and fuel tank 124 is located in wing 104. In these illustrative examples, fuel tank 122 and fuel tank 124 are formed by sealing structures inside of wing 102 and wing 104, respectively. A sealing system for fasteners in fuel tank system 120 may be implemented in accordance with an illustrative embodiment.

The different illustrative embodiments recognize and take into account one or more considerations. For example, the illustrative embodiments recognize and take into account that currently used sealing systems may employ seal caps that are configured to reduce the transfer of energy into fuel tank system 120 caused by an electromagnetic event. The transfer of energy may involve a spark, a static discharge, a gas under pressure, a heated gas, a mechanical force, or some other transfer of energy that may be undesirable within fuel tank system 120.

The illustrative embodiments also recognize and take into account that seal caps, used to reduce effects from an electromagnetic event, add undesired mass to the structure. Thus, the illustrative embodiments provide a method and apparatus for a lighter weight system for sealing fuel tank system 120, reducing a transfer of energy in fuel tank system 120, or a combination of the two. In one illustrative embodiment, a cover includes a housing configured to cover an end of a fastener. The cover is constructed to include a deformable material structure within the interior of the cover. In these illustrative examples, the deformable material includes cells. The deformable material is configured to contain energy within the cover in which the energy is caused by an electromagnetic event.

Figure 2:
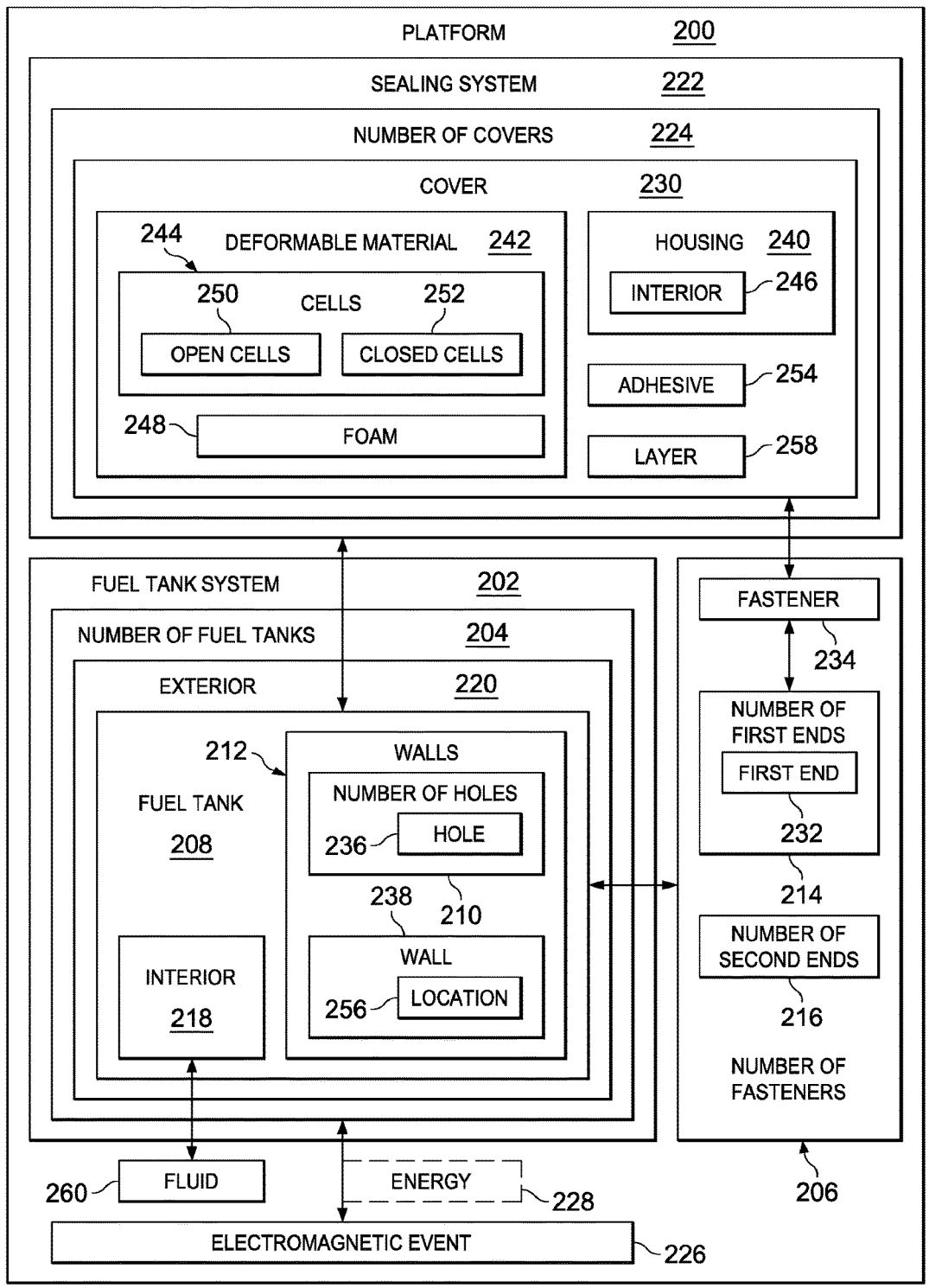
FIG. 2 is an illustration of a block diagram of a platform with a fuel system in accordance with an illustrative embodiment.

With reference next to FIG. 2, an illustration of a block diagram of a platform with a fuel system is depicted in accordance with an illustrative embodiment. In this illustrative example, aircraft 100 in FIG. 1 is an example of an implementation for platform 200 in FIG. 2.

Platform 200 includes fuel tank system 202. Fuel tank system 120 in FIG. 1 is an example of an implementation for fuel tank system 202 in FIG. 2. Fuel tank system 202 includes number of fuel tanks 204. As used herein, a "number of", when used with reference to items, means one or more items. For example, "number of fuel tanks 204" is one or more fuel tanks. Fuel tank 122 and fuel tank 124 in FIG. 1 are examples of fuel tanks that may be in number of fuel tanks 204. A fuel tank in number of fuel tanks 204 also may be in locations other than in wing 102 and wing 104 of aircraft 100. For example, a fuel tank may be located in body 106 of aircraft 100.

In these illustrative examples, number of fasteners 206 is installed in fuel tank 208 in number of fuel tanks 204. In particular, number of fasteners 206 may be installed in number of holes 210 formed in walls 212. Number of fasteners 206 has number of first ends 214 and number of second ends 216. Number of first ends 214 extends into interior 218 of walls 212 for number of fuel tanks 204. Number of second ends 216 is on exterior 220 of walls 212 of fuel tank 208.

In this illustrative example, sealing system 222 may be used in fuel tank 208 in number of fuel tanks 204. In particular, sealing system 222 may be used to seal number of fasteners 206 installed in fuel tank 208. More specifically, sealing system 222 may be used to seal number of holes 210 in walls 212 of fuel tank 208 with number of fasteners 206 installed in number of holes 210.

As depicted, sealing system 222 includes number of covers 224. Number of covers 224 is configured to cover number of first ends 214 in number of fasteners 206 that extend into interior 218 of fuel tank 208. Number of covers 224 may be seal caps in the illustrative examples.

In the illustrative examples, number of covers 224 is configured to reduce effects resulting from electromagnetic event 226. In particular, number of covers 224 may be configured to reduce the transfer of energy 228 into or within interior 218 of fuel tank 208. The transfer of energy 228 may be into interior 218 of fuel tank 208 from current caused by electromagnetic event 226. The transfer of energy 228 may be within interior 218 of fuel tank 208 from electrostatic charge that builds up on metal components within interior 218 of fuel tank 208.

In the illustrative examples, electromagnetic event 226 may be, for example, without limitation, a lightning strike, electrostatic discharge, or other types of discharge for platform 200. Electromagnetic event 226 may transfer energy 228 to platform 200.

In these illustrative examples, energy 228 may take a number of different forms. For example, energy 228 may be at least one of a spark, an electrostatic discharge, a gas under pressure, a heated gas, heat, a mechanical force, a moving particle, or some other form of energy that may be undesirable within interior 218 of fuel tank 208. As used herein, the phrase "at least one of", when used with a list of items, means different combinations of one or more of the listed items may be used and only one of each item in the list may be needed. For example, "at least one of item A, item B, and item C" may include, without limitation, item A, or item A and item B. This example also may include item A, item B, and item C, or item B and item C.

In the illustrative examples, a gas under pressure, the heated gas, or both may be caused by a spark generated at one or more of number of first ends 214 of number of fasteners 206, number of second ends 216 of number of fasteners 206, or some combination thereof. In other illustrative examples, a gas under pressure, a heated gas, or both may flow through one or more of number of holes 210 from exterior 220 of fuel tank 208. In some examples, the heated gas may also be under pressure. In still another illustrative example, energetic particles may originate from one or more of number of first ends 214 of number of fasteners 206 in response to electromagnetic event 226.

In the illustrative examples, number of covers 224 is configured to reduce and/or prevent energy 228 from being transferred into or within interior 218 of fuel tank 208. Number of covers 224 is configured to contain energy 228, absorb energy 228, or a combination of the two. By containing energy 228, absorbing energy 228, or a combination of the two, the amount of energy 228 reaching interior 218 of fuel tank 208 may be reduced or prevented, or both. In these illustrative examples, containing energy 228 means that the amount of energy 228 reaching interior 218 of fuel tank 208 is reduced, prevented, or reduced and prevented.

As depicted, cover 230 in number of covers 224 is configured to cover first end 232 of fastener 234 in number of fasteners 206. Cover 230 forms a barrier between first end 232 of fastener 234 and interior 218 of fuel tank 208.

First end 232 of fastener 234 is an end within number of first ends 214 that extend into interior 218 of fuel tank 208 from walls 212. In these illustrative examples, fastener 234 is installed in hole 236 within number of holes 210 in fuel tank 208.

In these illustrative examples, cover 230 is configured to be installed to cover first end 232 of fastener 234. For example, cover 230 may be attached to fastener 234. Cover 230 may be directly attached to fastener 234, indirectly attached to fastener 234, or some combination thereof.

For example, cover 230 may be attached to at least one of wall 238 in walls 212 and fastener 234. When cover 230 is attached to wall 238, cover 230 is considered to be indirectly attached to fastener 234. When cover 230 is attached to fastener 234, cover 230 is considered to be directly attached to fastener 234.

Further, the attachment may be a mechanical attachment, a chemical attachment, and/or some other suitable type of attachment mechanism. For example, with a mechanical attachment, cover 230 may be configured to have features that engage features of first end 232 of fastener 234, parts that surround first end 232 of fastener 234, or a combination of the two. These features may be present prior to attaching cover 230 to first end 232. In other words, the features may be "pre-formed features". Alternatively, these features may be formed after attaching cover 230 to first end 232 by shaping or altering the features within cover 230. The shaping or altering of features within cover 230 may be performed mechanically or chemically.

In the depicted examples, cover 230 in number of covers 224 is comprised of housing 240, deformable material 242, and cells 244 located within deformable material 242. Deformable material 242 with cells 244 is configured to contain energy 228 within interior 246 of housing 240 for cover 230 in a manner that reduces and/or prevents energy 228 from reaching interior 218 of fuel tank 208. Further, cover 230 with deformable material 242 having cells 244 may be configured to absorb energy 228. Energy 228 may be at least one of mechanical energy, thermal energy, and electrical energy. Deformable material 242, cells 244, or both may be selected to provide these types of energy containment or absorption.

As depicted, housing 240 may be comprised of a number of different materials. For example, housing 240 for cover 230 may be comprised of a material selected from at least one of carbon fiber and epoxy, fiberglass, metal, a metal alloy, plastic, and other suitable materials. The metal may be, for example, aluminum, titanium, and/or other suitable metals. The plastic may be, for example, a polysulfide and/or other suitable plastic materials. In the illustrative examples, material may be selected as one that does not retain undesired amounts of electric charges. The material may be selected as one that is electrostatically conductive.

In some illustrative examples, housing 240 may be comprised of the same material as deformable material 242. In one example, housing 240 may be a single structure formed from deformable material 242. In still other illustrative examples, housing 240 may be formed using the same material as deformable material 242 without cells 244. The selection of materials for housing 240 may be based on the ability of the materials to withstand the environment within fuel tank 208.

In these illustrative examples, deformable material 242 may be selected for an ability to contain energy 228, absorb energy 228, or both. In these illustrative examples, deformable material 242 may take a number of different forms. For example, deformable material 242 may be elastically deformable. In other words, deformable material 242 may change shape in response to energy 228. Deformable material 242 also may substantially return to its original shape in response to energy 228 when deformable material 242 is elastically deformable.

In these illustrative examples, deformable material 242 may be comprised of various materials. For example, deformable material 242 may be selected from a polymer, a shape memory polymer, and/or other suitable types of materials. In these illustrative examples, deformable material 242 with cells 244 may take the form of foam 248.

A cell in cells 244 is a volume within deformable material 242. This volume may take the form of a void or a pore in these illustrative examples. Cells 244 may be open cells 250 or closed cells 252. Open cells 250 are present when at least some of cells 244 are connected to each other and form an interconnected network. Closed cells 252 are present when cells 244 are not interconnected to each other.

Both of these types of cells may be filled with a fluid, a solid, or a combination thereof. The fluid may be a liquid or a gas, depending on the particular implementation and conditions within fuel tank 208. In some cases, closed cells 252 may include hollow particles embedded within deformable material 242. The solid may be in powder form in some illustrative examples.

In these illustrative examples, cells 244 may take the form of closed cells 252 in which closed cells 252 are comprised of microspheres. A microsphere is a spherical particle that has a diameter that may range from about one micrometer to about 1,000 micrometers. These microspheres may take the form of polymeric hollow spheres in the illustrative examples. These spheres may contain gas in the form of air, nitrogen, or any suitable gas. In other illustrative examples, these spheres may be formed from a compressible material.

In one illustrative example, the microspheres may be polymeric microspheres when the microspheres are formed from polymers. Polymeric microspheres are hollow spheres in these illustrative examples. Polymeric microspheres may be formed having substantially uniform sizes.

In other illustrative examples, these microspheres may have different sizes. The selection of sizes for microspheres or other forms of cells 244 may be selected to increase a volume within cover 230 that may be available to absorb energy 228. In these illustrative examples, the use of hollow microspheres may allow for lessening of the ingression of fluids from the external environment into cover 230. These hollow microspheres also may allow for increasing deformability when a load is applied to deformable material 242.

If cover 230 is comprised of the same material as deformable material 242 with cells 244, the porosity of deformable material 242 may be selected such that fuel in fuel tank 208 does not flow through cells 244 in deformable material 242. Depending on the material used in deformable material 242, the porosity of cover 230 may be different. In other words, a higher level of porosity may be achieved by varying concentration of microspheres. These microspheres are comprised of materials that are capable of being chemically and/or physically stable when exposed to fuel in fuel tank 208. Depending on the stability of the microspheres when exposed to fuel in fuel tank 208, these microspheres may touch each other or form networks or channels within deformable material 242.

In these illustrative examples, the microspheres may remain deformable at temperatures as low as about −75 degrees Celsius. Microspheres having this type of temperature stability may be comprised of, for example, fluorinated polymeric species or silicone containing polymers.

The use of these microspheres and other types of cells 244 may allow cover 230 to absorb force generated by gas formed within cover 230 during electromagnetic event 226. This gas may be generated by a spark or other particle. The deformation of deformable material 242 in cover 230 may allow for the dissipation of kinetic energy in particles that may be generated by electromagnetic event 226. These particles may include sparks, which are incandescent particles. The particles also may include other types of particles, such as pieces of a fastener, particles formed from deformable material 242 when deformable material 242 encounters a spark or hot gas, and other sources.

In these illustrative examples, cells 244 may be configured to increase an ability of cover 230 to contain energy 228, absorb energy 228, or a combination thereof. For example, a size, a distribution, a porosity, and other parameters for cells 244 may be selected to increase the ability of cover 230 to contain energy 228, absorb energy 228, or a combination thereof.

As another example, a polydispersity index (PDI) of the spheres may be changed. The polydispersity index is the broadness of the Gaussian curve that describes the diameters of cells 244 in deformable material 242. For example, deformable material 242 may have a porosity from about 0.5 percent to about 91 percent of the volume of deformable material 242.

Cells 244 may have a substantially uniform distribution within deformable material 242. Also, cells 244 may have other types of distributions, depending on the particular implementation. For example, less of cells 244 may be present in deformable material 242 near or in housing 240.

Further, cells 244 in deformable material 242 may provide an increased path length or additional path lengths for absorbing energy 228. In other words, cells 244 may define a number of paths that has a number of path lengths that may be increased as compared to a path length in the absence of cells 244. Path lengths may also increase from deformation of cover 230. For example, a particle may travel through deformable material 242 and bounce off of housing 240 of cover 230. Cells 244 may alter the path of the particle in a manner that provides for an increased path length for absorbing energy 228. This increased path length formed by cells 244 may reduce and/or prevent energy 228 from reaching interior 218 of fuel tank 208.

Further, the interface between deformable material 242 and cells 244 may absorb energy 228. The compressibility of deformable material 242 with cells 244 also may absorb energy 228.

Additionally, cover 230 also may include adhesive 254. Adhesive 254 may be configured to attach cover 230 to location 256 where fastener 234 is located. In these illustrative examples, adhesive 254 may be configured to attach cover 230 to at least one of fastener 234 and wall 238 at location 256. In some illustrative examples, adhesive 254 may be a component in deformable material 242. In other illustrative examples, adhesive 254 may be a separate component from deformable material 242.

In still other illustrative examples, cover 230 also may include layer 258. Layer 258 is configured to encompass deformable material 242. More specifically, layer 258 may encapsulate deformable material 242. In other words, deformable material 242 may be sealed within layer 258 in some illustrative examples.

Layer 258 may be used with either open cells 250 or closed cells 252 but may be especially useful with open cells 250. When open cells 250 are present, layer 258 may reduce fuel from entering deformable material 242.

Further, layer 258 may be a flyaway layer that is intended for removal after curing cover 230 when housing 240 and deformable material 242 are integral to each other.

In these illustrative examples, cover 230 also may be configured to seal hole 236 in which fastener 234 is installed. In other words, cover 230 may reduce or prevent fluid 260 from entering or exiting interior 218 of fuel tank 208 through hole 236.

In these illustrative examples, fluid 260 may pass through hole 236 from exterior 220 of fuel tank 208 and into interior 218 of fuel tank 208 without cover 230. In this case, fluid 260 may be air, gas, water, water vapor, and other types of fluids that may be undesirable in interior 218 of fuel tank 208. Further, fluid 260 may pass from interior 218 of fuel tank 208 to exterior 220 through hole 236 without cover 230. In this situation, fluid 260 may be fuel, fuel vapor, or other fluids that may be located in interior 218 of fuel tank 208.

As another example, deformable material 242, cells 244, or both may be selected as having properties configured to contain energy 228 in the form of thermal energy. The thermal energy may be, for example, in the form of a spark or heated gas. Deformable material 242, cells 244, or both may be selected to contain thermal energy within cover 230 in a manner that reduces the amount of thermal energy reaching interior 218 of fuel tank 208.

As yet another example, deformable material 242, cells 244, or both may be selected as having properties configured to contain energy 228 in the form of electrical energy. The electrical energy may be, for example, in the form of undesired current or an electrostatic charge that may potentially be discharged within interior 218 of fuel tank 208. Deformable material 242, cells 244, or both may be selected to contain electrical energy within cover 230 in a manner that reduces the amount of electrical energy reaching interior 218 of fuel tank 208. Deformable material 242 may also be selected to dissipate a static charge build up and/or electrical discharges within interior 218 that may form in interior 218 before the static charge discharges in interior 218 of fuel tank 208 as a spark or in some other undesirable manner.

The illustration of platform 200 with sealing system 222 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although platform 200 has been described as being implemented as an aircraft, platform 200 may take other forms. Platform 200 may be implemented using any type of platform in which a fuel system with a number of fuel tanks is present. For example, without limitation, other illustrative embodiments may be applied to a mobile platform, a stationary platform, a land-based structure, an aquatic-based structure, a space-based structure, or some other suitable platform. More specifically, the different illustrative embodiments may be applied to, for example, without limitation, a submarine, a bus, a personnel carrier, a tank, a train, an automobile, a spacecraft, a space station, a satellite, a surface ship, a power plant, a dam, a manufacturing facility, a power storage system, a building, or some other suitable platform. The power storage system may be, for example, a number of batteries.

Although sealing system 222 has been described as being used with number of fuel tanks 204, sealing system 222 may be used with other fuel tanks when number of fuel tanks 204 includes more than one fuel tank. Further, sealing system 222 also may be applied to exterior 220 of fuel tank 208. For example, additional covers in addition to cover 230 may be used to cover number of second ends 216 in number of fasteners 206. As another example, sealing system 222 may be applied to vessels other than fuel tank 208. Sealing system 222 may be applied to any vessel in which containment of energy 228 may be desired.

Figure 3:
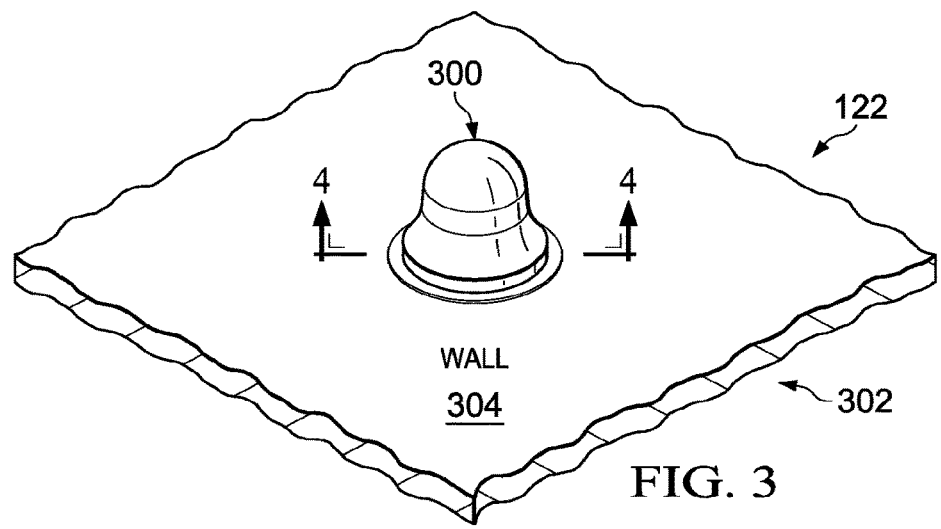
FIG. 3 is an illustration of a cover attached to a fastener in a fuel tank in accordance with an illustrative embodiment.

Turning next to FIG. 3, an illustration of a cover attached to a fastener in a fuel tank is depicted in accordance with an illustrative embodiment. In this illustrative example, cover 300 is attached to a fastener (not seen in this view) that extends into interior 302 of fuel tank 122 in FIG. 1. Cover 300 acts as a barrier between a fastener and interior 302 of fuel tank 122. In this illustrative example, cover 300 contacts wall 304 in interior 302 of fuel tank 122.

Figure 4:
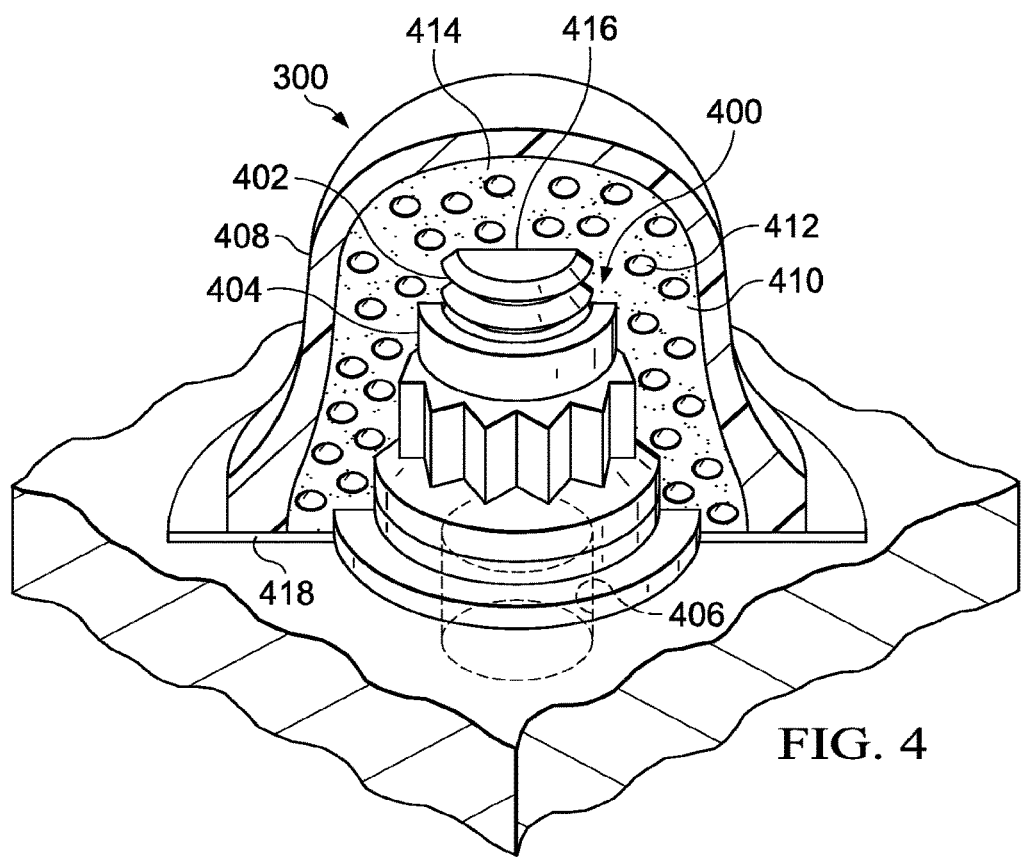
FIG. 4 is an illustration of a cross-sectional view of a cover attached to a fastener in accordance with an illustrative embodiment.

Turning now to FIG. 4, an illustration of a cross-sectional view of a cover attached to a fastener is depicted in accordance with an illustrative embodiment. In this example, cover 300 is shown in a cross-sectional view taken along lines 4-4 in FIG. 3.

Cover 300 covers fastener 400. As depicted, fastener 400 comprises bolt 402 and nut assembly 404 in this illustrative example. Fastener 400 is installed in hole 406 and extends into interior 302 in FIG. 3 of fuel tank 122 in FIG. 1. As depicted, cover 300 is attached to fastener 400 directly and indirectly.

As depicted, cover 300 comprises housing 408 and deformable material 410 with cells 412. Deformable material 410 with cells 412 takes the form of foam 414. In this illustrative example, foam 414 conforms to the shape of end 416 of fastener 400 in interior 302 of fuel tank 122. In other words, foam 414 has features that are configured to engage features at end 416 of fastener 400 in a manner that mechanically attaches cover 300 to fastener 400.

As depicted, foam 414 may be reacted to hold cover 300 in place on end 416 of fastener 400. In other illustrative examples, foam 414 may be pre-reacted to achieve a shape configured to be attached to end 416 of fastener 400. In other words, foam 414 may be used to attach cover 300 to end 416 of fastener 400.

In these illustrative examples, foam 414 also contacts wall 304 in FIG. 3. The contact is made in a manner that forms seal 418 between foam 414 and wall 304. Further, seal 418 also may be formed between wall 304 and housing 408.

Seal 418 may reduce and/or prevent energy from being transferred into interior 302 from fastener 400 or hole 406. For example, seal 418 may prevent a heated gas, a spark, and other undesired forms of energy from entering interior 302 of fuel tank 122. In addition, seal 418 also may prevent fuel in fuel tank 122 from exiting fuel tank 122 through hole 406.

In these illustrative examples, foam 414 in cover 300 may contain energy, absorb energy, or perform some combination of the two in these illustrative examples. Housing 408 also may be configured to contain energy, absorb energy, or perform some combination of the two. In this manner, cover 300 may provide protection from electromagnetic events. Cover 300 also may reduce or prevent the accumulation of an electric charge within fuel tank 122. For example, cover 300 may reduce or prevent the accumulation of an electric charge on fasteners or metal components in fuel tank 122. The accumulation of electric charge may be reduced or prevented by covering the portions of a fastener or metal component that extends into interior 302 of fuel tank 122 with cover 300. In this manner, cover 300 may also reduce the amount of energy that may enter interior 302 of fuel tank 122.

With this type of implementation, deformable material 410 for cover 300 may be comprised of a foam that is electrostatically conductive. A material is electrostatically conductive when the material dissipates or prevents electrostatic charge from being formed on the material. In other words, electrostatic potential that may form on the material may be dissipated or prevented. Further, housing 408 for cover 300 also may be comprised of the same material or a different electrostatically conductive material.

This protection may be provided with a lower weight as compared to using currently available seal caps. In these illustrative examples, the lower weight may be achieved through the use of deformable material 410 with cells 412. The presence of cells 412 may result in a lower density for deformable material 410 as compared to other types of substantially cell-free materials currently used in seal caps.

Cover 300 may have any dimensions that are configured to cover end 416 of fastener 400. The selection of dimensions for cover 300 may be selected such that a distance between fastener 400 at end 416 and interior 302 of fuel tank 122 may be greater than about 0.1 inches.

For example, cover 300 may have a diameter of about 1.4 inches and a height of about one inch. Of course, these values may vary for different types of fasteners.

The thickness of housing 408 for cover 300 also may depend on the particular material used for housing 408, the type of fastener, and other suitable factors. For example, housing 408 may have a minimum thickness of about 0.100 inches. In other words, other portions of housing 408 may be thicker than 0.100 inches.

The illustrations of cover 300 in FIG. 3 and FIG. 4 are not meant to imply physical or architectural limitations to the manner in which covers may be implemented. Cover 300 is depicted as one manner in which cover 230 shown in block form in FIG. 2 may be implemented as a physical structure. Other covers may have other shapes and sizes, depending on the particular implementation.

The different components shown in FIGS. 1, 3, and 4 may be combined with components in FIG. 2, used with components in FIG. 2, or a combination of the two. Additionally, some of the components in FIGS. 1, 3, and 4 may be illustrative examples of how components shown in block form in FIG. 2 can be implemented as physical structures.

With reference now to FIG. 5, an illustration of a flowchart of a process for operating a platform with a fuel tank is depicted in accordance with an illustrative embodiment. The process illustrated in FIG. 5 may be implemented in a platform, such as platform 200 in FIG. 2. In particular, this process may be implemented using aircraft 100 in FIG. 1.

The process begins by operating the platform using fuel in the fuel tank (operation 500). The fuel tank has a number of fasteners having a number of ends extending into the interior of the fuel tank. The process then contains energy within a number of covers covering the number of ends in response to an electromagnetic event (operation 502), with the process terminating thereafter. The electromagnetic event may be, for example, a lightning strike. A cover in the number of covers comprises a housing and a deformable material with cells. This cover contains energy within boundaries of the cover.

The flowchart and block diagrams in the depicted embodiments illustrate the architecture, functionality, and operation of some possible implementations of apparatuses and methods in an illustrative embodiment. In this regard, each block in the flowchart or block diagrams may represent a module, segment, function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Illustrative embodiments of the disclosure may be described in the context of aircraft manufacturing and service method 600 as shown in FIG. 6 and aircraft 700 as shown in FIG. 7. Turning first to FIG. 6, an illustration of an aircraft manufacturing and service method is depicted in accordance with an illustrative embodiment. During pre-production, aircraft manufacturing and service method 600 may include specification and design 602 of aircraft 700 in FIG. 7 and material procurement 604.

During production, component and subassembly manufacturing 606 and system integration 608 of aircraft 700 takes place. Thereafter, aircraft 700 may go through certification and delivery 610 in order to be placed in service 612. While in service 612 by a customer, aircraft 700 is scheduled for routine maintenance and service 614, which may include modification, reconfiguration, refurbishment, and other maintenance or service.

Each of the processes of aircraft manufacturing and service method 600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 7, an illustration of an aircraft is depicted in which an illustrative embodiment may be implemented. In this example, aircraft 700 is produced by aircraft manufacturing and service method 600 in FIG. 6 and may include airframe 702 with plurality of systems 704 and interior 706. Examples of systems 704 include one or more of propulsion system 708, electrical system 710, hydraulic system 712, environmental system 714, and fuel tank system 716. In these illustrative examples, any number of other systems may be included. Although an aerospace example is shown, different illustrative embodiments may be applied to other industries, such as the automotive industry or electrical storage industry. Electrical storage products may include batteries.

Apparatuses and methods embodied herein may be employed during at least one of the stages of aircraft manufacturing and service method 600 in FIG. 6. In one illustrative example, components or subassemblies produced in component and subassembly manufacturing 606 in FIG. 6 may be fabricated or manufactured in a manner similar to components or subassemblies produced while aircraft 700 is in service 612 in FIG. 6.

As yet another example, one or more apparatus embodiments, method embodiments, or a combination thereof may be utilized during production stages, such as component and subassembly manufacturing 606 and system integration 608 in FIG. 6. For example, number of covers 224 in FIG. 2 may be designed during specification and design 602 and fabricated during component and subassembly manufacturing 606. Number of covers 224 may be installed during system integration 608 in fuel tank system 716.

Number of covers 224 may be used during operation of aircraft 700. The use of number of covers 224 may reduce effects from electromagnetic events that may occur in or on aircraft 700. Further, number of covers 224 may be added to fuel tank system 716 during maintenance and service 614. Number of covers 224 may replace seal caps or other sealing components for fasteners in fuel tank system 716. One or more apparatus embodiments, method embodiments, or a combination thereof may be utilized while aircraft 700 is in service 612 and/or during maintenance and service 614 in FIG. 6.

Thus, one or more of the illustrative embodiments provides a sealing system configured to contain energy through deformable materials. This controlling of energy occurs through the use of a deformable material through the compressibility of the deformable material rather than the use of a substantially cell-free mass as with currently employed seal caps.

In the illustrative embodiments, the deformable material with the cells has a porosity that provides a desired amount of deformability in response to energy that may be generated in the interior of the cover in response to an electromagnetic event. In this manner, the deformable material with the cells may be configured to deform in response to energy, such as a force, that may be generated by gas, particles, or other sources in response to an electromagnetic event. Further, a deformable material within the cells also may absorb energy imparted by the electromagnetic event.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for operating a platform with a fuel tank, the method comprising:
   operating the platform using fuel in the fuel tank, wherein the fuel tank has a fastener having an end within an interior of the fuel tank; and
   containing energy within a cover that covers the end such that at least one of a housing of the cover, a deformable material in the cover, and cells present within the deformable material contain the energy within the cover, wherein the energy is caused by an electromagnetic event.

2. The method of claim 1, wherein containing the energy within the cover comprises:
absorbing at least one of mechanical force, heat, and an electrostatic discharge using the at least one of the housing of the cover, the deformable material in the cover, and the cells.

3. The method of claim 1, further comprising:
preventing fuel from flowing out of the fuel tank.

4. A method for absorbing energy within a cover, the method comprising:
filling an interior of the cover with a deformable material;
creating a path wherein the energy flows from an end of a fastener on an exterior of a fuel tank, through a hole in the exterior of the fuel tank, and into the deformable material;
dissipating the energy;
wherein the deformable material comprises cells; and
wherein creating a path further comprises extending the path through the cells of the deformable material.

5. The method of claim 4, wherein dissipating the energy comprises:
deforming the deformable material.

6. The method of claim 5, wherein the deformable material is elastically deformable and has an original shape and further comprising:
substantially returning the deformable material to the original shape after deforming the deformable material.

7. The method of claim 5, wherein deforming the deformable material comprises compressing the deformable material.

8. A method for absorbing energy within a cover, the method comprising:
filling an interior of the cover with a deformable material;
creating a path wherein the energy flows from an end of a fastener on an exterior of a fuel tank, through a hole in the exterior of the fuel tank, and into the deformable material;
dissipating the energy;
wherein the energy is caused by an electromagnetic event, the deformable material comprises a foam, and wherein dissipating the energy comprises:
absorbing a force generated by a gas formed within the cover during the electromagnetic event.

9. The method of claim 4, wherein the energy comprises at least one of mechanical energy, thermal energy, and electrical energy.

10. The method of claim 4, wherein the energy is a moving particle and wherein creating a path further comprises:
bouncing the moving particle off of a housing of the cover.

11. The method of claim 10, wherein dissipating the energy comprises dissipating kinetic energy in the moving particle.

12. A method for containing energy within a cover, the method comprising:
filling an interior of the cover with a deformable material;
creating a path wherein the energy flows from an end of a fastener on an exterior of a fuel tank, through a hole in the exterior of the fuel tank, and into the deformable material;
altering the path to reduce energy flow;
wherein the deformable material comprises cells; and
wherein altering the path comprises extending the path through the cells of the deformable material.

13. The method of claim 12, wherein altering the path comprises:
compressing the deformable material.

14. The method of claim 12, further comprising:
forming a seal between the deformable material and the interior of the cover; and
using the seal to prevent energy transfer.

15. The method of claim 14, further comprising:
using the seal to reduce or prevent fluid from entering or exiting the fuel tank.

16. The method of claim 12, further comprising:
preventing accumulation of electrical charge using the cover.

17. The method of claim 12, further comprising:
placing a layer between the cover and the deformable material.

18. The method of claim 17, wherein creating the path further comprises modifying the path such that the energy flows through the layer before flowing into the deformable material.

* * * * *